(12) United States Patent
Smith et al.

(10) Patent No.: US 8,572,364 B2
(45) Date of Patent: *Oct. 29, 2013

(54) METHOD AND APPARATUS FOR BOOTING FROM A FLASH MEMORY

(75) Inventors: Michael Smith, San Francisco, CA (US); Nir Wakrat, San Jose, CA (US); Tahoma Toelkes, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,844

(22) Filed: Apr. 26, 2012

(65) Prior Publication Data
US 2012/0210116 A1 Aug. 16, 2012

Related U.S. Application Data

(63) Continuation of application No. 12/167,112, filed on Jul. 2, 2008, now Pat. No. 8,171,277.

(51) Int. Cl.
*G06F 15/177* (2006.01)

(52) U.S. Cl.
USPC .............................................. 713/2; 711/103

(58) Field of Classification Search
USPC ............................................... 713/2; 711/103
See application file for complete search history.

(56) References Cited

U.S. PATENT DOCUMENTS

| | | | |
|---|---|---|---|
| 7,006,377 B2 | 2/2006 | Oh | |
| 7,234,052 B2 | 6/2007 | Lee et al. | |
| 7,257,703 B2 | 8/2007 | Kishida et al. | |
| 7,296,143 B2 | 11/2007 | Gaskins et al. | |
| 8,060,687 B2 * | 11/2011 | Yuan et al. | 711/103 |
| 2005/0207232 A1 | 9/2005 | Delfs et al. | |
| 2006/0195650 A1 | 8/2006 | Su et al. | |
| 2007/0061498 A1 | 3/2007 | Chua et al. | |
| 2007/0113067 A1 | 5/2007 | Oh et al. | |
| 2008/0126776 A1 | 5/2008 | Takayama | |
| 2008/0200206 A1 | 8/2008 | Mansson et al. | |
| 2008/0294838 A1 | 11/2008 | Houston et al. | |

OTHER PUBLICATIONS

"How to boot from a Single Level Cell NAND Flash Memory", STMicroelectronics, Apr. 2007, pp. 1-22.
"Increased Boot Options with Managed NAND", Quick Logic Corporation, 2007, pp. 1-8.
"Open NAND Flash Interface Specification", Revision 1.0 , Dec. 28, 2006, (Hynix Semiconductor; Intel Corporation; Micron Technology, Inc.; Phison Electronics Corporation, Sony Corporation; and STMicroelectronics, pp. ii-102.
"TN-29-16: Boot from NAND with the TI OMAP 2420 Processor", Micron Technology, Inc., 2006, pp. 1-19.
K9HAG08U1M K9L8G08U0M K9MBG08U5M Preliminary Flash Memory, K9XXG08UXM, Samsung Electronics, 44 pages, 2005.

* cited by examiner

*Primary Examiner* — Albert Wang
(74) *Attorney, Agent, or Firm* — Meyertons, Hood, Kivlin, Kowert & Goetzel, P.C.

(57) ABSTRACT

Techniques for booting a computing device with a flash memory without knowledge of parametric information of the flash memory are described herein. In one embodiment of the invention, the computing device receives input requesting the computing device to begin operation and executes a set of one or more instructions stored in a non-volatile memory. The execution of the set of instructions configures a first read routine for accessing the flash memory based on a common denominator format of candidate flash memories, and the first read routine is not configured based on information located in a flash memory identification table. The computing device reads a bootstrapping code image based on the first read routine into a volatile memory and executes that first bootstrapping code image. Other methods and apparatuses are also described.

16 Claims, 6 Drawing Sheets

METHOD AND APPARATUS FOR BOOTING FROM A FLASH MEMORY

This application is a continuation of U.S. application Ser. No. 12/167,112 filed on Jul. 2, 2008 now U.S. Pat. No. 8,171, 277.

BACKGROUND

1. Field

Embodiments of the invention relate to the field of booting a computing device; and more specifically, to the booting of a computing device from flash memory, such as NAND flash memory.

2. Background

Flash memory is a non-volatile memory that is a specific type of EEPROM (Electrical Erasable Programmable Read-Only Memory) semiconductor memory. There are generally two commonly used types of flash memory that are in use: NOR flash and NAND flash. Typically, a NAND flash memory is less expensive, has higher capacity, and has faster program and erase times, than that of a NOR flash memory. For this reason, NAND flash is commonly used in computing devices for data storage (e.g., media players, cellular telephones, smart mobile phones, thumb drives, digital cameras, computers, etc.).

NAND flash memory is error prone. Thus, an error correction algorithm must be performed when writing data to the NAND flash memory and when reading data from the NAND flash memory. A NAND flash memory is organized into blocks and further organized into pages. The page size of a NAND flash memory varies between manufacturer and the variety of flash memory, but generally ranges from 512 bytes to 4,096 bytes. A block may be, for example, 32 pages of 512 bytes, or 64 pages of 2048 bytes. Each page is typically split between a large data area portion to store data, undo smaller spare area portion used to store error correction parity information, bad block management, etc. For example, a page of size 2112 bytes is typically split between a 2048 byte data area and a 64 byte spare area. The amount of data space required for error correction typically depends on the page size of the NAND flash memory and the particular error correction algorithm chosen. For example, a NAND flash memory with a large page size requires an error correction algorithm that produces a large amount of error correction parity information; whereas a NAND flash memory with a smaller page size requires an error correction algorithm that produces a smaller amount of error correction parity information.

There is no standard for accessing all varieties of NAND flash memories. Thus, different manufacturers of NAND flash memories, and even different NAND flash models within a manufacturer, may require different commands and/or variations of commands, to access those NAND flash memories. To handle these differences, typically a NAND flash identification table is maintained on the computing device. For example, in a typical method to boot from a NAND flash memory, the computing device must be aware of parametric information of the NAND flash memory (e.g., error correction configuration (e.g., type, parity size), device addressing (e.g., size of pages read from the NAND flash memory). I/O signal timing, etc.). Due to the variable nature of NAND flash memory (e.g., no standard command interface to the NAND flash memory), the parametric information cannot be automatically determined by the computing device (e.g., through interrogating the device as if it were a standard hard disk) without additional hardware or software employed in the computing device. Thus, typically the computing device stores a parametric table of known NAND flash memories (identifiable by the manufacturer and flash memory ID) that may act as boot devices in a read only memory (ROM) that is not changed after it has been written. During the boot up process, the computing device determines the parametric information of the NAND flash from the parametric table and, among other things, configures the read routine to access the NAND memory based on the information in the parametric table. Since the NAND flash parametric table is stored in ROM, any change to the flash parametric table requires a replacement of the ROM. Thus, any new NAND flash memories that are developed once the parametric table is written to the ROM cannot be used in the boot up process (e.g., they will not have entries in the parametric table).

Additionally, the product cycle of a NAND flash memory is typically faster than that of the ROM storing the parametric table. In other words, in a typical computing device booting from a NAND flash, the ROM is programmed with the NAND flash parametric table before a NAND device is selected for use in the computing device. Thus, a NAND device may be selected that is not included in the NAND flash parametric table (e.g., if the type of NAND device was manufactured at a later time than when the ROM was programmed) and thus cannot be used as the boot device.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
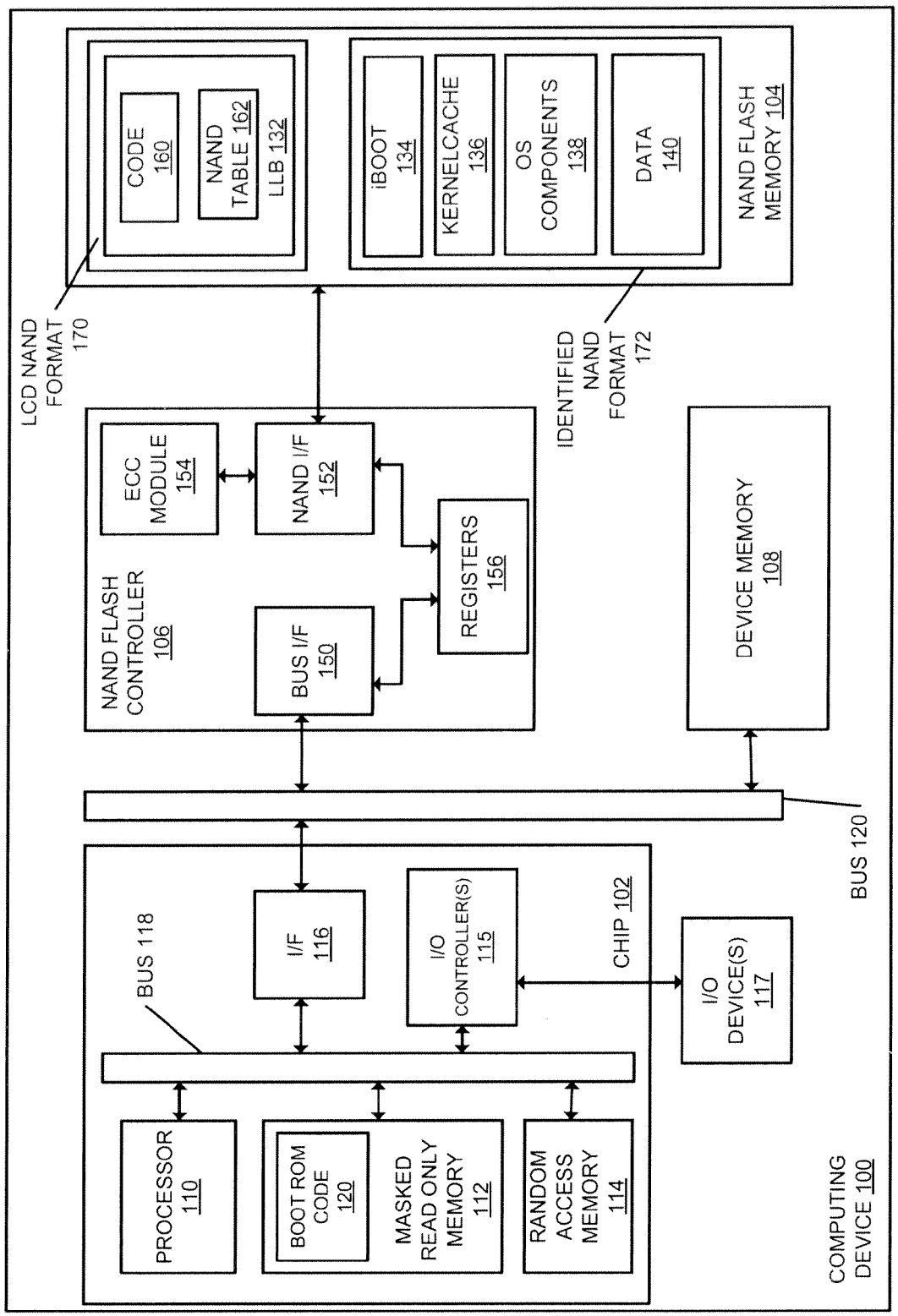
FIG. 1 illustrates an exemplary computing device configured to boot from a NAND flash memory without knowledge of parametric information of the NAND flash memory according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more computing devices (e.g., laptop, workstation, mobile device (e.g., mobile phone, portable music player, game player, digital camera, navigation device, etc.), etc.). Such computing devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more user input/output devices (e.g., a touchscreen, a keyboard, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given computing device typically stores code and/or data for execution on the set of one or more processors of that computing device. Of course, one or more parts of an embodiment of the invention may be implemented using different combinations of software, firmware, and/or hardware.

A method and apparatus for booting a computing device with, in one embodiment of the invention, NAND flash memory without knowledge of parametric information of that NAND flash memory is described. In one embodiment of the invention, the computing device receives input requesting the computing device to begin operation and executes a set of one or more instructions stored in a masked ROM or other non-volatile storage device. The execution of the set of instructions configures a first read routine for accessing the NAND flash memory based on a predefined least common denominator format of candidate NAND flash memories known at a time when the set of instructions was written to the ROM. The computing device reads a first bootstrapping code image based on the configured read routine into RAM, and executes that first bootstrapping code image. According to another embodiment of the invention, the execution of the first bootstrapping code image causes the computing device to determine the parametric information of the NAND flash and configure a second read routine based on the parametric information of the NAND flash memory. The computing device reads a second bootstrapping code image from the NAND flash memory according to the parametric information, and executes that second bootstrapping code image. While this description uses NAND flash memory as an example, it will be understood that other embodiments may use other types of non-volatile semiconductor memory, such as PCM (phase change memory).

FIG. 1 illustrates an exemplary computing device 100 configured to boot from a NAND flash memory 104 without knowledge of parametric information of the NAND flash memory 104, according to one embodiment of the invention. FIG. 1 will be described with reference to the exemplary flow diagrams of FIGS. 3, 4, and 6. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

Referring to FIG. 1, the computing device 100 includes a chip 102, device bus 120, device memory 108 (e.g., random access memory (RAM)), a NAND flash controller 106, and a NAND flash memory 104. As used herein, a computing device is a form of a data processing device, which may be a general purpose computer, a special purpose computer, a personal digital assistant (PDA), a mobile computer (e.g., a laptop or handheld device), an embedded device, a smart phone, a cellular telephone, or other consumer electronic devices. The architecture of the computing device illustrated in FIG. 1 is an example of an architecture of a data processing device, and other, alternative architectures may be used with the embodiments of the invention described herein. The chip 102 (e.g., a system on an integrated circuit) includes a processor 110, a masked read only memory (ROM) 112, a random access memory (RAM) 114 (e.g., cache memory), an interface 116, and chip bus 118. Chip 102 may be a single integrated circuit (IC); in alternative embodiments of the invention, a set of ICs (two or more) may implement the functions of the chip 102 in a computing device. One or more I/O (Input/Output) controllers 115 are coupled with the bus 118 to provide an interface between one or more I/O devices 117 and the rest of the computing device 100. The I/O devices 117 may include one or more of a display, a keyboard, a touch input panel, a button for a switch (e.g., on/off switch), a cursor control device such as a mouse, a speaker for generating sound, a cellular wireless radio transceiver, a wireless network transceiver, a serial interface port, etc. The masked ROM 112 includes the boot ROM code 120. According to one embodiment of the invention, the boot ROM code 120 includes a set of one or more instructions that are executed upon the computing device 100 receiving input to start operation of the computing device 100 (e.g., when the computing device 100 is powered on, or the computing device 100 is reset). According to one embodiment of the invention, the masked ROM 112 is programmed by the manufacturer of the chip 102 (which is not necessarily the manufacturer of the computing device 100) and cannot be changed once written. Thus, in this embodiment of the invention, once written, the boot ROM code 120 cannot be modified unless the masked ROM 112 is replaced. The instructions of the boot ROM code 120 will be described in greater detail later herein.

The NAND flash controller 106 includes a device bus interface 150, registers 156, an error correction code (ECC) module 154, and a NAND interface 152. The bus interface 150 allows the NAND flash controller 106 to access the device bus 120 and the NAND interface 152 allows the NAND flash controller 106 to access the NAND flash memory 104. The registers 156 allow data to be transferred in and out of the NAND flash controller 106. The ECC module performs one or more error correction algorithms on pages read from, and written to, the NAND flash memory 104 (e.g., Hamming code algorithm, Reed-Solomon algorithm, Bose-Chaudhuri-Hoequenghem (BCH) algorithm, etc.). For example, when writing data into a page of the NAND flash memory 104, the ECC module 154 computes the error correction code (i.e., error correction parity information) and writes this information to the page (the error correction parity information may be written to the data area of the page or the spare area of the page, depending on the storage format of the page, which is described in greater detail later herein). Similarly, when reading data from a page of the NAND flash memory 104, the ECC module 154 computes the expected error correction parity information from the page and performs a comparison with the stored error correction parity information in the page to detect errors. While in some embodiments of the invention the ECC module 154 is implemented in hardware (e.g., through one or more ECC hardware accelerators), in alternative embodiments of the invention the ECC module 154 is implemented in software.

The NAND flash memory 104 includes a least common denominator (LCD) NAND format 170 and an identified NAND format 172. Thus, some pages of the NAND flash memory 104 are stored in a LCD NAND format and other pages are stored in an identified NAND format. The two storage formats (LCD and identified), and the differences between the two storage formats, will be discussed in greater detail later herein. The LCD NAND format 170 includes a LLB (Low-Level Boot) 132. The LLB 132 includes the code image 160 and the NAND table 162 (thus, the code image 160 and the NAND table 162 are stored in the NAND flash memory 104 in a LCD format). According to one embodiment of the invention, the code image 160 is a first bootstrapping code image which is called by execution of the boot ROM code 120. The identified NAND format 172 includes the iBOOT 134, the kernelcache 136, operating system components 138, and data 140 (thus, iBOOT 134, kernelcache 136, OS components 138, and data 140 are stored in the NAND flash memory 104 in an identified format, which is described in greater detail later herein). According to one embodiment of the invention, the NAND flash memory 104 is selected after the instructions in the masked ROM 112 have been written. Thus, at the time when the boot code 120 is written to the masked ROM 112, the type of NAND flash (e.g., page size, parity size requirement, etc.) that will be used in the computing device 100 is not known.

Figure 2:
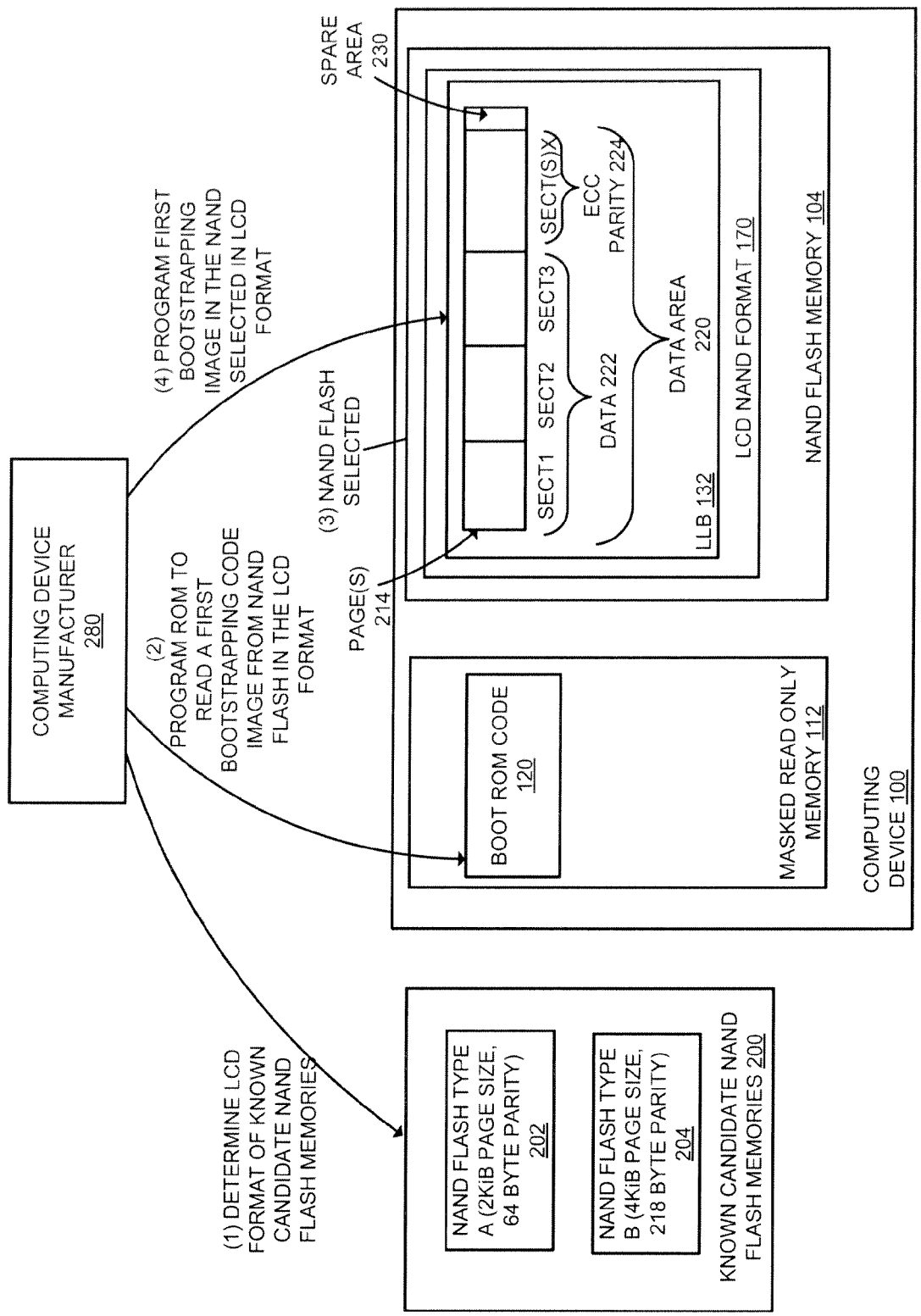
FIG. 2 is an exemplary data flow diagram illustrating configuring the exemplary computing device of FIG. 1 to boot from the NAND flash memory with a least common denominator format for storage of the NAND flash memory according to one embodiment of the invention.

FIG. 2 is an exemplary data flow diagram illustrating configuring the computing device 100 of FIG. 1 to boot from the NAND flash memory 104 with a least common denominator format for storage of the NAND flash memory 104 according to one embodiment of the invention. Since the manufacturer of the computing device 100 (e.g., computing device manufacturer 280) does not know the type of NAND flash that will be used in the computing device 100 at the time the boot ROM code 120 is written to the masked ROM 112, the computing device manufacturer 280 programs the boot ROM code 120 in a way that each known candidate NAND flash memory may be used as a boot device (e.g., in order to read the LLB code image 132 from the NAND flash memory). For example, the known candidate NAND flash memories 200 includes NAND flash type A 202 (2 KiB (2048 bytes) page size that requires 64 bytes of error correction parity information), and NAND flash type B 204 (4 KiB (4096 bytes) page size that requires 218 bytes of error correction parity information). Either of these two types of NAND flash memories may be used in the computing device 100. Additionally, other types of NAND flash memories illustrated in FIG. 2 may be used in the computing device 100, (e.g., they did not exist at the time the boot ROM code 120 is written to the masked ROM 112), which will be described in greater detail later herein. Other NAND flash memory types, not shown in FIG. 2, may not be candidate NAND flash memories due to a variety of reasons (e.g., very small NAND flash memories for the computing device 100, unreliable NAND flash memories, etc.).

Since any of the known candidate flash memories may be selected for use as a boot device in the computing device 100 at some point in the future (and the amount of error correction parity information required varies among the known candidate flash memories), the boot ROM code 120 is programmed to read the maximum amount of error correction parity information required by a flash memory included in the known candidate NAND flash memories. Thus, in the exemplary configuration of the computing device 100, the boot code ROM 120 is programmed such that the computing device 100 can read, at least 218 bytes of error correction parity information for each page (e.g., in case a type B NAND flash memory is used as a boot device in the computing device 100). As discussed previously, in a typical NAND page storage format, the error correction parity information is stored in the spare area of a page. However, it should be understood that 218 bytes of error correction parity information cannot be stored in the spare area of a NAND flash type A memory (the spare area of a type A NAND flash memory is only 64 bytes). Thus, according to one embodiment of the invention, the computing device manufacturer 280 determines a least common denominator (LCD) storage format based on the known candidate flash memories that allows a type A or a type B NAND flash memory to be used as a boot device in the computing device 100. According to one embodiment of the invention, the LCD format allows storage of the maximum amount of error correction parity information required by a flash memory included in the known candidate flash memories in the smallest page size of a flash memory included in the known candidate flash memories. Thus, at an operation 1, the computing device manufacturer 280 determines a LCD NAND format of the known candidate flash memories 200.

Sometime after determining the LCD NAND format, at an operation 2, the computing device manufacturer 280 causes the masked ROM 112 (e.g., the boot ROM code 120) to be programmed to read a first bootstrapping code image (e.g., code image 160 in the LLB 132) from the NAND flash memory 104 in the LCD NAND format 170. It should be understood that the computing device manufacturer 280 does not necessarily program the masked ROM 112. For example, the computing device manufacturer 280 may provide the boot ROM code 120 to a manufacturer of the masked ROM 112, which then programs the boot ROM code 120 to the masked ROM 112.

Sometime after the masked ROM 112 is programmed with the boot ROM code 120, at operation 3, the NAND flash memory 104 is selected for use as a boot device in the computing device 100. While in some embodiments of the invention the selected NAND flash memory 104 is included in the known candidate NAND flash memories 200, in alternative embodiments of the invention the selected NAND flash memory 104 is not included in the known candidate NAND flash memories 200 (e.g., the selected NAND flash memory did not exist at the time the known candidate NAND flash memories 200 was determined). Since the boot ROM code 120 is programmed to read a first bootstrapping code image (e.g., code image 160 in the LLB 132) in the LCD NAND format, the first bootstrapping code image is programmed to the selected NAND flash memory (e.g., NAND flash memory 104) in the LCD NAND format e.g., LCD NAND format 170). Thus, sometime after the NAND flash memory 104 is selected for use, at operation 4, the computing device manufacturer 280 programs the first bootstrapping code image (e.g., code image 160 in the LLB 132) to the NAND flash memory 104 in the LCD NAND format 170.

According to one embodiment of the invention, the LCD NAND format 170 of the LLB 132 includes using only a subset of the data area 220 of the page(s) 214 for data 222, and at least a portion of the data area 220 for the error correction parity information 224. It should be understood that, in the LCD NAND format 170, the spare area 230 of each page does not store error correction parity information. Thus, unlike a typical NAND format, the data area 220 of the page(s) 214 includes the data information 222 and the ECC parity information 224. In the exemplary LCD NAND format 170 illustrated in FIG. 2, three sectors (e.g., sect1 through sect3) of the data area 220 store the data information 222, and the remaining sectors (e.g., sect(s)x) store the ECC parity information 224). A sector typically is 512 bytes; thus 1536 bytes (3*512 bytes) of each page's data area 220 stores the data 222, and the remaining bytes of the data area 220 store the ECC parity information.

Thus, it should be understood that the LCD storage format does not fully use the capacity of the page's data area (e.g., some of the data area 220 of the page does not include data 222 or ECC parity information 224). For example, the exemplary NAND format 170 illustrated in FIG. 2 uses approximately 1754 bytes of each page's data area (1536 bytes of data plus 218 bytes of ECC parity information). If the NAND flash memory 104 is of type A (e.g., 2 KiB page size), for each page in the LCD NAND format 170, approximately 294 bytes out of its data area of 2048 are not used. If the NAND flash memory 104 is of type B (e.g., 4 KiB page size), for each page in the LCD NAND format 170, approximately 2342 bytes out of its data area of 4096 are not used. However, the computing device manufacturer 280 can be certain that the computing device 100 supports booting from a NAND flash type A 202 or from a NAND flash type B 204.

Thus, the LCD NAND format 170 sacrifices capacity for compatibility (e.g., more than one specified type of NAND device may be used as a boot device without knowledge of NAND parametric information). As one example, at the time the boot ROM code 120 is programmed to the masked ROM 112, the NAND flash type B may be prohibitively expensive to use as a boot device in the computing device 100. However, during the time period between the masked ROM 112 being programmed and the computing device 100 being manufactured, the cost of the NAND flash type B may drop to a point that the computing device manufacturer 280 may want to use it as a boot device in the computing device 100. Storing the first bootstrapping code image in a LCD format allows the manufacturer of the computing device the flexibility of using different types of NAND flash memories as boot devices, without having knowledge of parametric information of the NAND flash memory selected and without requiring interrogation of the NAND flash memory.

Furthermore, unlike other computing devices that boot from a NAND flash memory, a NAND parametric table is not used to identify the parameters of the NAND flash memory before the first bootstrapping code image is read from NAND flash memory by the computing device. Thus, NAND flash memories that may not have been included in a NAND parametric table (e.g., they did not exist until after the boot ROM code was written) may be used as a boot device. Furthermore, unlike some other systems that boot from NAND flash memory, a separate storage device that is updatable, (e.g., a NOR flash) does not need to be used to store a NAND parametric table. It should be understood that adding a separate storage device (e.g., a NOR flash) is more expensive both in terms of cost, and in terms of space on the computing device 100.

Figure 3:
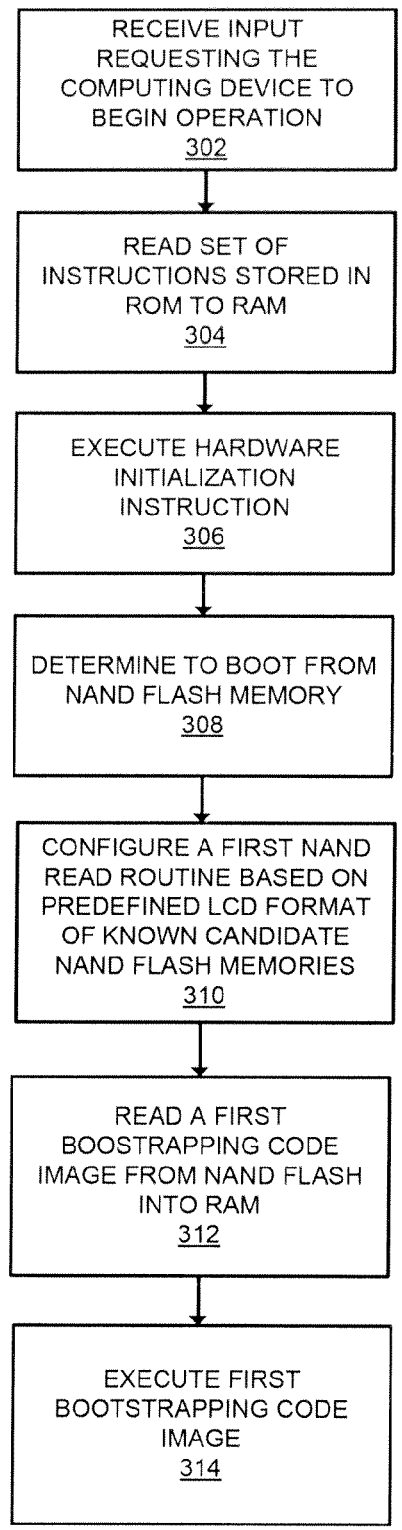
FIG. 3 is an exemplary flow diagram illustrating booting the exemplary computing device of FIG. 1 from the NAND flash memory without knowledge of parametric information of the NAND flash memory according to one embodiment of the invention.

Referring to FIG. 3, at block 302 the computing device 100 receives input requesting the computing device to begin operation (e.g., when the computing device 100 is powered on, or the computing device 100 is reset, etc.). After receiving this input signal, the processor 110 reads the set of one or more instructions stored in the masked ROM 112 (e.g., from the boot ROM code 120) into RAM 114, at block 304. At block 306, the processor 110 executes a hardware initialization instruction 306. According to one embodiment of the invention, the hardware initialization instruction 306 configures the runtime environment of the chip 102 (e.g., the memory management unit (MMU), caches, interrupts, etc.) and initializes hardware (e.g., power gates, clock gates, clock trees, busses (e.g., bus 118), etc.). Sometime after the hardware initialization instruction is executed, at block 308, the execution of a next instruction(s) causes the computing device 100 to determine to boot from the NAND flash memory 104 (e.g., strapping options of the chip 100 indicates that the NAND flash memory 104 is a boot device). Sometime later, the execution of a next instruction(s) causes the computing device 100 to configure a first read routine based on the predefined LCD format of known candidate NAND flash memories at block 310.

Figure 4:
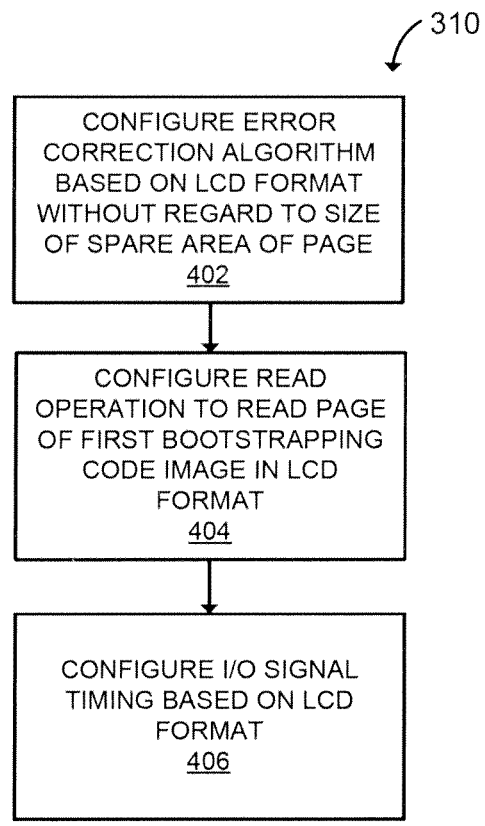
FIG. 4 is a flow diagram illustrating an exemplary read routine of the NAND flash memory based on the least common denominator format of the NAND flash memory according to one embodiment of the invention.

Referring to FIG. 4, which is a flow diagram illustrating an exemplary configuration of the read routine of block 310 according to one embodiment of the invention, the computing device 100 configures the error correction algorithm based on the LCD format without regard to the size of the spare area of each page, at block 402. For example, the according to one embodiment of the invention, the error correction algorithm chosen is the highest supported by the ECC module 154 in the NAND flash controller 106. At block 404, the computing device 100 configures a read operation to read page(s) of the first bootstrapping code image (e.g., code image 160 in the LLB 132) in the LCD NAND format (e.g., LCD NAND format 170). At block 406, the computing device 100 configures input/output (I/O) signal timing based on the LCD NAND format (e.g., LCD NAND format 170).

Referring back to FIG. 3, sometime after the read routine is configured, the first bootstrapping code image (e.g., code image 160 in the LLB 132) is read from the NAND flash memory 104 into RAM 114 according to the LCD read routine, at block 311 Sometime later, at block 314, the processor 110 executes the First bootstrapping code image (e.g., code image 160 in the LLB 132).

According to one embodiment of the invention, execution of the first bootstrapping code image (e.g., code image 160 in the LLB 132) causes a second bootstrapping code image (e.g., iBOOT 134) to be executed. According to one embodiment of the invention, the LLB 132 is updatable (e.g., through a firmware update). If the LLB 132 is updatable, according to one embodiment of the invention, the LLB 132 includes a NAND parametric identification table 162 in addition to the code image 160. It should be understood that although the LLB may include the NAND parametric information table 162, this table cannot be used to update the boot ROM code 120 since the masked ROM 112 cannot be updated unless the masked ROM 112 is physically replaced. However, the NAND parametric information table 162 may be used to configure a read routine according to the parametric information of the NAND flash memory 104. Thus, with reference to FIG. 1, iBOOT 134, kernelcache 136, OS components 138, and data 140 are each stored in the identified NAND format 172 according to the parametric information table 162. In other words, according to one embodiment of the invention, only the first bootstrapping code image is stored in a LCD format; whereas subsequent bootstrapping code images, operating system(s), and/or data (e.g., documents, video, music, etc.) are stored in an identified NAND format.

Figure 5:
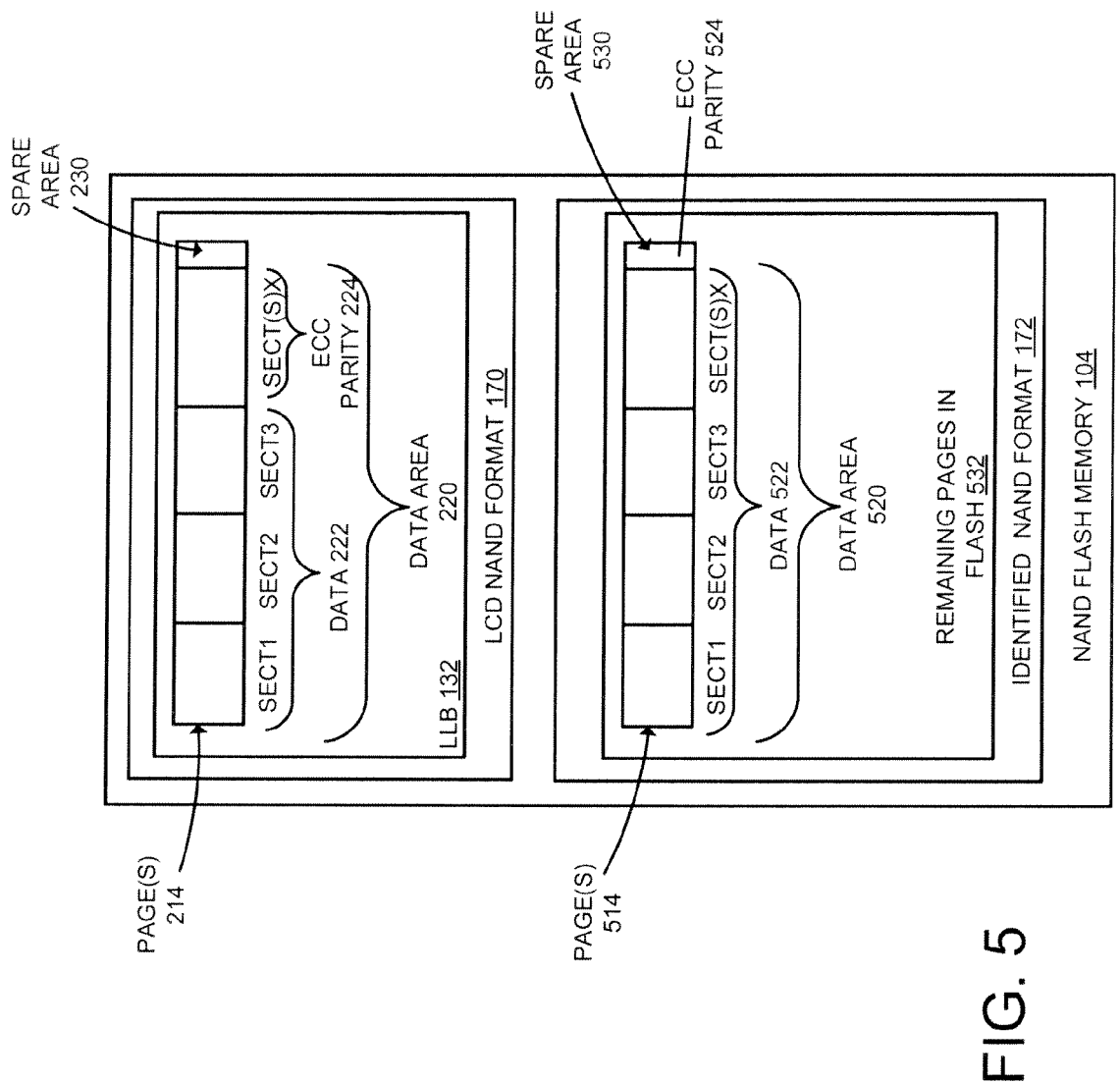
FIG. 5 is an exploded view of the NAND flash memory of FIG. 1 exemplary illustrating a first set of one or more pages of the NAND flash memory stored in a least common denominator format and a second set of one or more pages stored in an identified NAND format according to one embodiment of the invention.

FIG. 5 is an exploded view of the NAND flash memory 104 which illustrates a first set of one or more pages of the NAND flash memory stored in a LCD format and a second set of one or more pages stored in an identified NAND format, according to one embodiment of the invention. The LLB 132 is stored in the LCD NAND format as described with reference to FIG. 2. The remaining pages in the flash memory 532 (e.g., pages including the iBOOT 134, kernelcache 136, OS components 128, and data 140) are stored in the identified NAND format 172. For each page in the identified NAND format 172, the data area 520 stores only data information 522, and the spare area 530 stores the ECC parity information 524.

Figure 6:
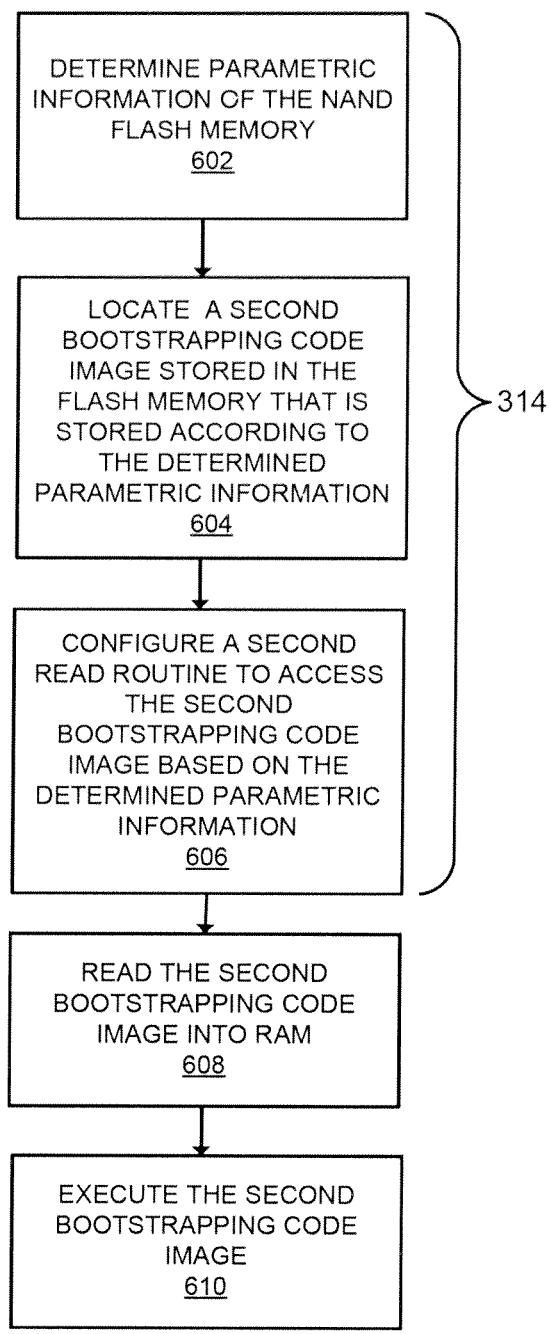
FIG. 6 is an exemplary flow diagram illustrating using the NAND flash memory with its identified parametric information after executing a first bootstrapping code image according to one embodiment of the invention.

Referring to FIG. 6, the execution of the first bootstrapping code image in block 314 of FIG. 3 (e.g., execution of the code 160 of LLB 132) causes the computing device to determine the parametric information of the NAND flash memory at block 602 (e.g., through use of the NAND parametric table 162). Sometime later, at block 604, the computing device 100 locates a second bootstrapping code image (e.g., iBOOT 134) stored in the NAND flash memory 104 that is stored according to the identified NAND format 172. At block 606, the computing device 100 configures a second read routine to access the second bootstrapping code image (e.g., iBOOT 134) based on the determined parametric information (e.g., the second read routine includes configuring the error correction configuration (e.g., type, parity size required), addressing (e.g., size of individual pages read from the NAND flash memory), I/O signal timing, etc.). Sometime later, at block 608, the computing device 100 reads the second bootstrapping code image (e.g., iBOOT 134) into RAM 114. At block 610, the second bootstrapping code image (e.g., iBOOT 134) is executed. According to one embodiment of the invention, the execution of the second bootstrapping code image (e.g., iBOOT 134) causes the kernelcache 136 to be loaded which then causes the OS components 138 to be loaded, which then allows the computing device 100 to access the data 140.

Thus, according to one embodiment of the invention, the computing device 100 may read (and execute) a first bootstrapping code image from a NAND flash memory without knowledge of parametric information of that NAND flash memory, and read subsequent stages of the boot process, as well as other data, according to the parametric information of that NAND flash memory. According to one embodiment of the invention, since only the first bootstrapping code image is stored in the LCD format, the amount of space sacrificed for the flexibility of booting from a variety of and/or unknown NAND flash memories, without knowledge of NAND parametric information, is fairly low. Additionally, it may be possible to replace a NAND flash memory (e.g., 2 KiB page size) with a different type of NAND flash memory (e.g., 4 KiB page size) and still be able to boot the computing device without having to replace or modify the boot ROM code in the masked ROM (i.e., the boot ROM code supports booting from multiple types of NAND flash memory without knowledge of parametric information of the NAND flash memory selected).

Also, storing the first bootstrapping code image in an LCD format promotes code reuse since the boot ROM code in the masked ROM may be used in different types of computing devices that each boot from a NAND flash memory. For example, the same boot ROM code may be used in a computing device (e.g., media player) with a relatively small NAND flash (e.g., 2 KiB page size) and a computing device (e.g., smart mobile phone) with a comparatively larger NAND flash (e.g., 4 KiB page size). As another example, there may be different models of the computing device with differing storage capacities e.g., a computing device may have a premium model with a larger storage capacity (e.g., larger NAND flash size with a large page size) and a standard model with a smaller storage capacity (e.g., smaller NAND flash site with a smaller page size). Thus, the same boot ROM code may be used multiple models of the same computing device.

While embodiments of the invention have described the NAND flash controller 106 apart from the chip 102, in alternative embodiments of the invention the NAND flash controller is integrated onto the chip 102. While embodiments of the invention have described the NAND flash memory 104 included in the computing device 100, in alternative embodiments of the invention the NAND flash memory 104 is located remotely from the computing device 100.

While embodiments of the invention have described execution of the first bootstrapping code image causing a second bootstrapping code image to be executed, in alternative embodiments of the invention execution of the first bootstrapping code image causes the kernelcache to be loaded.

While embodiments of the invention have described only the first bootstrapping code image being stored in a LCD format, in alternative embodiments of the invention, some others, or all pages, in the NAND flash memory are stored in the LCD format.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method for booting a computing device with a flash memory without knowledge of parametric information of the flash memory, comprising;

receiving an input requesting the computing device to begin operation;

executing a set of one or more instructions stored in a first memory of the computing device, wherein executing the set of instructions performs, locating the flash memory, and configuring a first read routine for accessing the flash memory based on a common denominator format of candidate flash memories, the first read routine able to access data in the candidate flash memories, the common denominator format does not fully utilize the capacity of a page in the flash memory for at least one of the candidate flash memories, and the first read routine is not configured based on information located in a flash memory identification table;

reading a first bootstrapping code image from the flash memory, according to the first read routine, into a volatile memory of the computing device, wherein the configured read routing using an error correction algorithm that, for each written page of the first bootstrapping code image, produces more parity data than can be stored in the written page's spare area; and executing the first bootstrapping code image.

2. The computer implemented method of claim 1, wherein the first memory is a read only memory (ROM) which is a masked ROM whose contents cannot be changed once written, wherein the flash memory is a NAND flash memory, and wherein the common denominator format is based on candidate flash memories known at a time when designing the ROM.

3. The computer implemented method of claim 1, further comprising, writing the first bootstrapping code image into one or more pages of the flash memory, wherein for each written page of the first bootstrapping code image, using a subset of the page's data area for data information and at least a portion of the page's data area remaining for error correction parity information.

4. The computer implemented method of claim 2, further comprising writing the set of instructions to the ROM without knowledge of parametric information of the flash memory.

5. The computer implemented method of claim 1, wherein executing the first bootstrapping code image causes the following to be performed,
determining parametric information of the flash memory based on a flash memory identification table;
locating a second bootstrapping code image stored in the flash memory, wherein the second bootstrapping code image is not stored in the common denominator format but rather is stored according to the parametric information of the flash memory;
configuring a second read routine for accessing the second bootstrapping code image in the flash memory based on the parametric information of the flash memory;
reading the second bootstrapping code image from the flash memory, according to the configured second read routine, into the volatile memory of the computing device; and
executing the second bootstrapping code image.

6. The computer implemented method of claim 5, wherein the first bootstrapping code image includes the flash memory identification table, and wherein content of the first bootstrapping code image is updatable.

7. The computer implemented method of claim 5, further comprising writing the second bootstrapping code image into the flash memory according to the parametric information of the flash memory.

8. A non-transitory machine-readable storage medium that provides instructions that, when executed by a processor, will cause said processor to perform operations for booting a computing device with a flash memory without knowledge of parametric information of the flash memory, comprising:
receiving an input requesting the computing device to begin operation;
executing a set of one or more instructions stored in a first memory of the computing device, wherein executing the set of instructions performs, locating the flash memory, and
configuring a first read routine for accessing the flash memory based on a common denominator format of candidate flash memories, the first read routine able to access data in the candidate flash memories, the common denominator format does not fully utilize the capacity of a page in the flash memory for at least one of the candidate flash memories, and the first read routine is not configured based on information located in a flash memory identification table;
reading a first bootstrapping code image from the flash memory, according to the first read routine, into a volatile memory of the computing device, wherein the configured read routine using an error correction algorithm that, for each written page of the first boostrapping code image, produces more parity data that can be stored in the written page's spare area; and
executing the first bootstrapping code image.

9. The non-transitory machine-readable storage medium of claim 8, wherein the first memory is a read only memory (ROM) which is a masked ROM whose contents cannot be changed once written, wherein the flash memory is a NAND flash memory, and wherein the common denominator format is based on candidate flash memories known at a time when designing the ROM.

10. The non-transitory machine-readable storage medium of claim 9, further comprising writing the set of instructions to the ROM without knowledge of parametric information of the flash memory.

11. The non-transitory machine-readable storage medium of claim 8, wherein executing the first bootstrapping code image causes the following to be performed,
determining parametric information of the flash memory based on a flash memory identification table;
locating a second bootstrapping code image stored in the flash memory, wherein the second bootstrapping code image is not stored in the common denominator format but rather is stored according to the parametric information of the flash memory;
configuring a second read routine for accessing the second bootstrapping code image in the flash memory based on the parametric information of the flash memory;
reading the second bootstrapping code image from the flash memory, according to the configured second read routine, into the volatile memory of the computing device; and
executing the second bootstrapping code image.

12. The non-transitory machine-readable storage medium of claim 11, wherein the first bootstrapping code image includes the flash memory identification table, and wherein content of the first bootstrapping code image is updatable.

13. The non-transitory machine-readable storage medium of claim 12, further comprising writing the second bootstrapping code image into the flash memory according to the parametric information of the flash memory.

14. A data processing device, comprising:
a processor;
an input device coupled with the processor, the input device being configured to receive an input to request the data processing device to begin operation;
a non-volatile semiconductor memory coupled with the processor, wherein the processor is configured to establish a first read routine for accessing the non-volatile semiconductor memory based on a common denominator format of candidate non-volatile semiconductor memories, wherein the first read routine able to access data in the candidate flash memories, the common denominator format does not fully utilize the capacity of a page in the flash memory for at least one of the candidate flash memories, and the first read routine is not configured based on information located in a memory identification table, and to read a first bootstrapping code image from the flash memory, according to the first read routine, into a volatile memory of the computing device, wherein the configured read routine using an error correction algorithm that, for each written page of the first bootstrapping code image, produces more parity data than can be stored in the written page's spare area.

15. The data processing device as in claim 14, wherein the processor boots the data processing device without knowledge of parametric information of the non-volatile semiconductor memory, and wherein the processor is configured to read a first bootstrapping code image from the non-volatile semiconductor memory and to load the first bootstrapping code image into a volatile memory of the data processing device.

16. The data processing device as in claim 15 further comprising:

a wireless radio transceiver coupled with the processor.

* * * * *